United States Patent [19]

Badsey

[11] Patent Number: 4,842,091
[45] Date of Patent: Jun. 27, 1989

[54] TWO-WHEELED RECREATIONAL MOTOR VEHICLE

[76] Inventor: William J. Badsey, 30162 Silver Spur Rd., San Juan Capistrano, Calif. 92675

[21] Appl. No.: 80,710
[22] Filed: Aug. 3, 1987
[51] Int. Cl.[4] .................. B62D 61/00; A63C 17/00
[52] U.S. Cl. ................................ 180/219; 180/181; 280/221; 280/87.041
[58] Field of Search ............... 180/216, 219, 226, 181; 280/221, 87.04 R; D12/110; D21/81

[56] References Cited

U.S. PATENT DOCUMENTS

| | | | |
|---|---|---|---|
| D. 203,387 | 1/1966 | Watson | D12/110 |
| 3,648,795 | 3/1972 | Moulton | 180/216 |
| 3,995,873 | 12/1976 | Pantzar | 280/87.04 A |
| 4,143,728 | 3/1979 | Shiber | 180/181 |
| 4,151,892 | 5/1979 | Franken | 180/181 |
| 4,707,884 | 11/1987 | Chang | 280/87.04 |

FOREIGN PATENT DOCUMENTS 2025715  12/1971  Fed. Rep. of Germany ...... 180/181

Primary Examiner—Charles A. Marmor
Assistant Examiner—Donn McGehan
Attorney, Agent, or Firm—Ernest A. Beutler

[57] ABSTRACT

A self-propelled recreational vehicle of the two-wheeled type. The vehicle has a platform beneath which front and rear wheels carrying wide tires are journaled. The width of the tires is such that the vehicle will be stable regardless of whether a rider is standing on the platform.

8 Claims, 2 Drawing Sheets

TWO-WHEELED RECREATIONAL MOTOR VEHICLE

BACKGROUND OF THE INVENTION

This invention relates to a two-wheeled recreational motor vehicle and more particularly to an improved type of recreational vehicle.

A variety of types of recreational motor vehicles have been proposed. These vehicles have a wide variety of designs and may employ one, two, three, four, or more wheels at least one of which is driven by a powering device such as an internal combustion engine. If the vehicle is designed primarily for recreational purposes, it must satisfy two quite dissimilar design criteria. First, it must be fun and challenging for the user to ride. On the other hand, the vehicle should also be relatively safe for inexperienced riders and still afford them an opportunity for enjoyment and the feel of control over the vehicle. Unfortunately, the vehicles of the type previously proposed have not satisfied all of these purposes to the same degree. That is, the previously proposed recreational motor vehicles have either been extremely challenging to ride and, accordingly, somewhat unsafe for inexperienced operators or have been very safe and, almost attendantly, have offered no challenge for the operator.

It is, therefore, a principal object of the invention to provide an improved recreational vehicle which will provide a challenge in operation and yet which is extremely safe to operate.

It is a further object of this invention to provide an improved, highly mobile recreational vehicle which offers a high degree of safety and at the same time a challenge to operate.

Another disadvantage with previously proposed recreational motor vehicles is that they have been designed to operate on public roads or must be operated in an off the road condition which requires the rider to travel a substantial distance from his home to a riding area. The reason for this is the size and power capability of the previously proposed vehicles. Therefore, such vehicles have substantially limited applicability.

Therefore, it is stil a further object of this invention to provide a recreational motor vehicle that may be ridden in residential areas without damage or aggravation to the property owners.

SUMMARY OF THE INVENTION

A first feature of this invention is adapted to be embodied in a self-propelled wheeled vehicle that comprises a platform adapted to carry a rider standing upon the platform. At least one driven rear wheel is rotatably journaled by the platform and underlies an area upon the platform where a riders feet are positioned. At least one front wheel is positioned forwardly of the rear wheel and beneath the platform and is journaled by the platform.

Another feature of this invention is adapted to be embodied in a self-propelled two wheeled vehicle comprised of a rider's platform that is adapted to carry a rider in a standing position with the rider's feet on the platform. A single rear wheel is journaled by the platform and a single front wheel is journaled by the platform and is positioned forwardly of the rear wheel. A means is carried by the platform for driving at least one of the wheels and the wheels have sufficient width so that the vehicle will remain erect even when a rider is not standing upon the platfrom.

DETAILED DESCRIPTION OF THE PREFERRED EMBODIMENTS OF THE INVENTION

Figure 1:
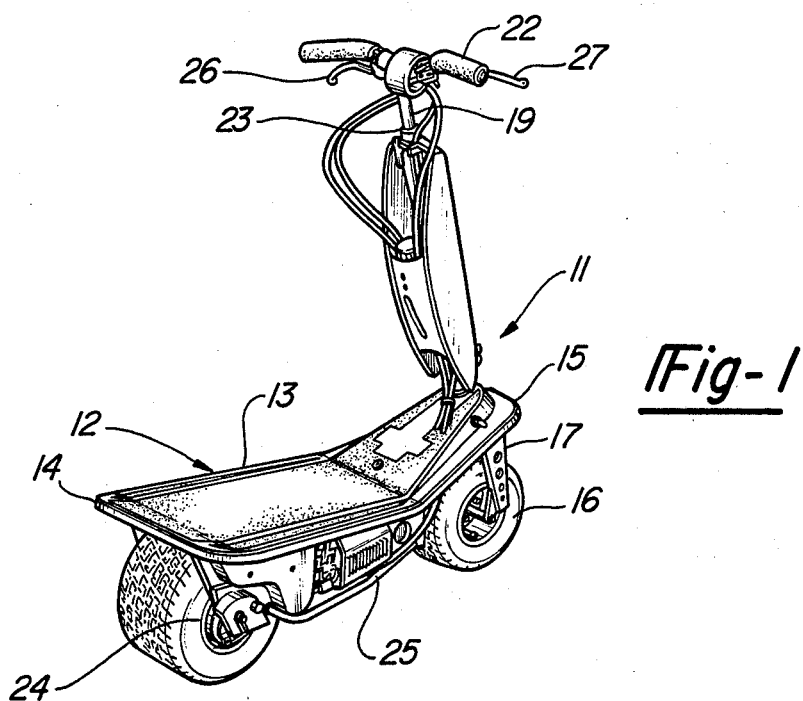
FIG. 1 is a perspective view of a recreational motor vehicle constructed in accordance with an embodiment of the invention looking from above and the rear.

Referring now in detail to the drawings, a motor vehicle constructed in accordance with an embodiment of the invention is indicated generally by the reference numeral 11. The motor vehicle 11 is designed primarily for recreational purposes and is designed in such a way that it can be operated by persons of a wide age range. As will become apparent, the vehicle 11 has a high degree of safety and yet offers a challenging ride for users of many ages.

The vehicle 11 is comprised of a rider's platform, indicated generally by the reference numeral 12. The platform 12 may be formed from any suitable material such as a metal or the like and has a first generally planar area 13 that extends along a substantially horizontal plane but which is inclined slightly upward from front to rear. At the rear end of the portion 13, there is provided a raised lip 14. Forwardly of that portion 13, there is provided a planar portion that extends generally horizontally but which is inclined upwardly and forwardly and which is indicated in the drawing by the reference numeral 15. Substantially all of the upper surface of the platform 12 may be textured in a suitable manner so as to offer a surface so that a rider's feet will not easily slide from the platform 12. The rear portion of the platform portion 13 is relatively wide for a reason to be described.

Supported beneath the platform 12 and specifically under the front portion 15 there is provided a front wheel 16 that carries a large cross-sectional small diameter low pressure pneumatic tire. The wheel and tire 16 is supported by means of a front fork assembly 17 that is journaled on the platform area 16 by means of a journal assembly 18 for steering movement of the front fork 17 and front wheel 16.

Figure 2:
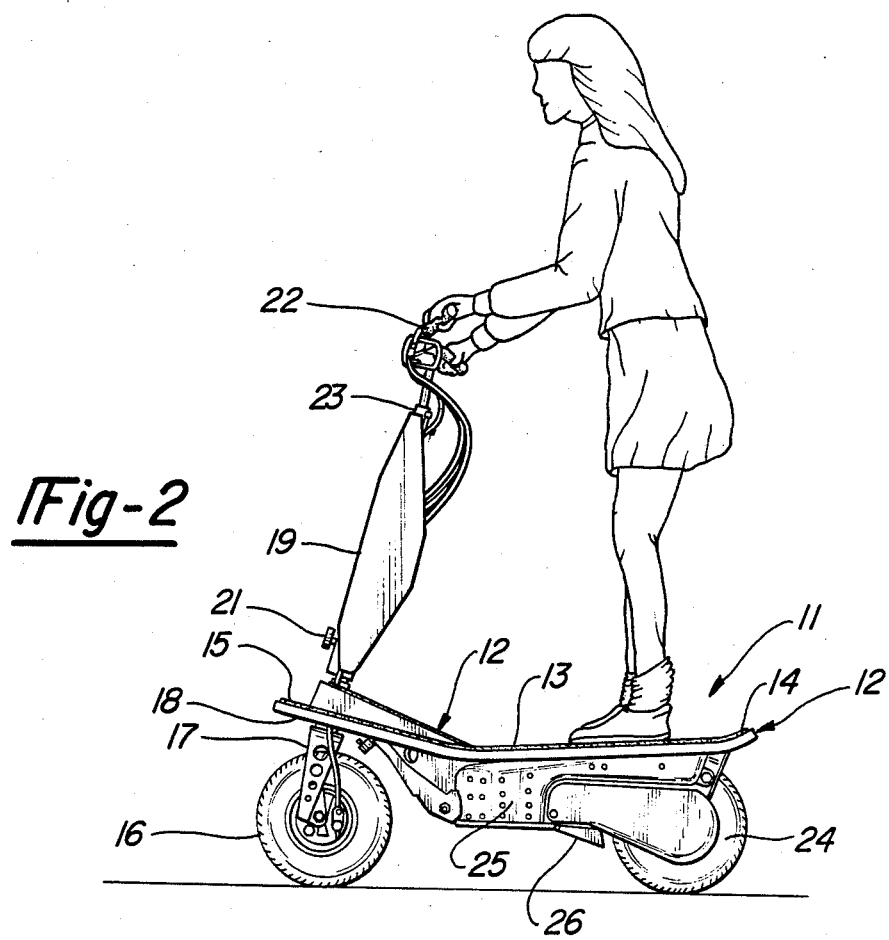
FIG. 2 is a side elevational view of the vehicle showing a rider in place.
Figure 3:
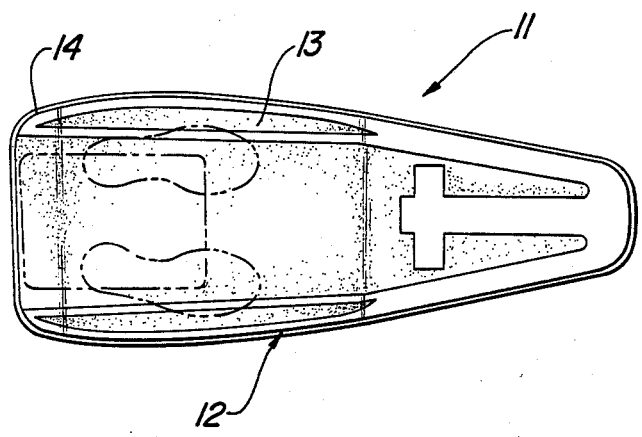
FIG. 3 is a top plan view of the vehicle platform showing where a rider's feet are positioned on the platform in relation to the wheels.
Figure 4:
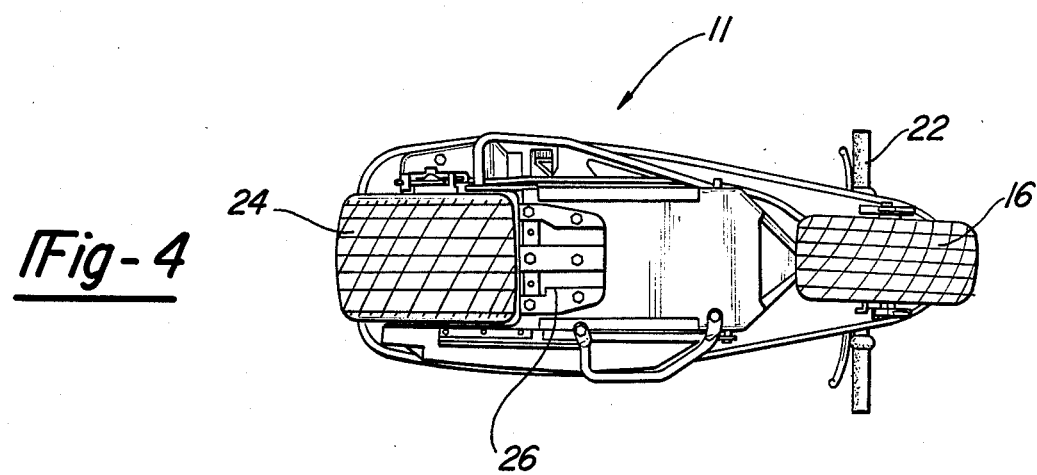
FIG. 4 is a bottom plan view of the vehicle.
Figure 5:
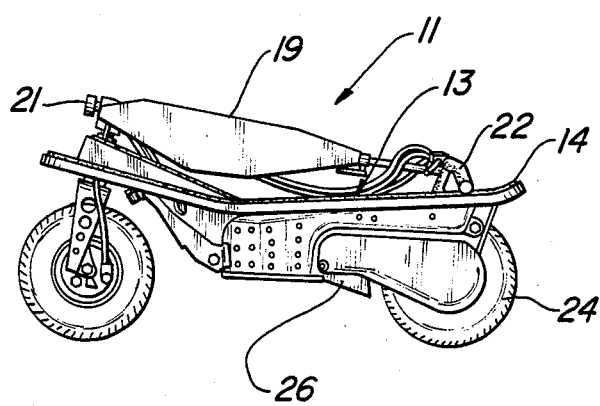
FIG. 5 is a side elevational view, in part similar to FIG. 2, showing the vehicle folded into a storage or transportation position.

The fork 17 has an upwardly extending portion which is connected by means of a pivotal joint assembly (not shown) to a steering shaft 19. The pivotal joint assembly permits the steering shaft 19 to be pivoted relative to the platform 12 between a raised riding position as shown in FIGS. 1 and 2 and a lowered carrying or storage position as shown in FIG. 5. A releasable locking mechanism 21 is incorporated for locking the steering shaft 19 in either of these positions.

A small handle bar assembly 22 is carried at the upper end of the steering shaft 19 so as to allow a rider standing on the platform 12 to steer the front wheel 16. If desired, the steering shaft 19 may include a telescopic joint 23 so as to permit the handle bar assembly 22 to be adjusted vertically upwardly or downwardly so as to accommodate riders of greatly different heights.

A single rear wheel 24 is journaled by the platform 12 beneath the rear portion of the section 13 and extends rearwardly so that is at least partially an underlying relationship to the rear lip 14. Like the front wheel 16, the rear wheel 24 mounts a large low pressure balloon tire. The wheels and tires are sized such that the vehicle 11 will be erect even when a rider is not standing upon the platform 12 so that the vehicle 11 is self supporting. In addition, the width of the tires mounted on the wheels 16 and 24 is such to afford good stability and a large enough foot print that the vehicle can be operated on residential lawns or the like without damaging them. In a preferred embodiment of the invention, the front wheel and tire has a size of $11 \times 5\frac{1}{2} \times 5$ while the rear wheel and tire has a size of $11 \times 7 \times 5$. As a result, the front and rear wheels have the same diameter but the rear wheel has a slightly greater width than the front wheel. This is to accommodate the fact that the rider's weight is concentrated primarily over the rear wheel 24.

Although it is preferred to employ a single, wide rear wheel and tire, the vehicle may also be provided with a pair of side by side rear wheels and tires which are close enough to each other to have the same effect as a single, wide rear wheel and tire.

A frame assembly 25 is positioned beneath the platform 12 and contains a powering internal combustion engine which drives the rear wheel 24 through a belt or chain drive of a known type with a centrifugal clutch. Since the power unit per se forms no part of the invention it has not been illustrated. However, a typical power unit which may be utilized is a 33.6 cc 2.2 horsepower, electric start, two cycle single cylinder gasoline engine that has a maximum speed of about 7,000 rpm and which is air-cooled. Such an engine is sold by Yamaha Motor Co. Ltd. under the Model No. OU99. It is to be understood, however, that a wide variety of power units or driving arrangements may be employed in connection with the invention. The important features of the invention are the layout of the vehicle and the riding position relative to the front and rear wheel 16 and 24.

The front and rear wheels 16 and 24 may be provided with brakes of the drum or disc tupe and these brakes are controlled by means of levers 26 carried by the handlebar assembly 22. In addition, a throttle control lever 27 is also carried by the handlebar assembly 22 so as to permit a rider to control the speed of the power unit and, accordingly that of the vehicle 11.

The underside of the frame 25 is provided with a skid plate 26 that is disposed immediately forwardly of the rear wheel 24 and which is designed so as to contact a curb in the event a rider attempts to ride the vehicle 12 from the road onto the property. The skid plate 26 will contact the curb and insure that the rear wheel 24 can drive over the curb and permit the vehicle to be driven from the road onto the private property.

While a wide variety of dimensions may be employed, in a practical embodiment of the invention, the overall length of the vehicle 12 may be 41 inches with its erect height with the steering shaft 19 in its upright position being 49 inches. In the folded position as shown in FIG. 5, the height is about 21 inches. The wheel base between the front and rear wheel 16 and 24 is about 29 inches and the width is 19 inches. There is a ground clearance of $5\frac{1}{2}$ inches and the rider's feet are only $11\frac{1}{2}$ inches off of the ground. This is particularly important because anytime the rider feels like he may be losing control of the vehicle he can immediately regain control by placing one or both of his feet on the ground. Since the step down is very small, there is no danger associated with this and the rider is provided with a large degree of security both physical and mental.

The total vehicle weight is approximately 75 lbs. in a preferred embodiment and as such the vehicle can be conveniently carried in any of the wide variety of vehicles such as the trunk of an automobile or the like. In the folded position, the steering shaft 19 may be configured to provide a carrying handle so as to facilitate the manipulation of the stored vehicle.

The balance of the vehicle is also such that a rider standing on the platform 13 may shift his weight back to the rear lip 14 to perform "wheelies". However, due to the extremely low center of gravity and the low height off of the ground for the rider's feet, such wheelies are not at all dangerous and stability may easily be regained by leaning forward. Thus, the vehicle 12 provides a large degree of safety and, at the same time, offers the rider a great challenge.

The platform portion 13 has sufficient width that the rider may place his feet transversely outside of the footprint of the rear wheel so that the rider may effect sufficient weight transfer to assist in steering or, when operating with the front wheel 16 off the ground (during a wheelie), completely steer the vehicle.

It should be understood that the foregoing is a description of a preferred embodiment of the invention and that various changes and modifications may be made without departing from the spirit and scope of the invention, as defined by the appended claims.

What is claimed is:

1. A self-propelled wheeled vehicle comprising a platform having a generally planar unencumbered rider's area adapted to carry a rider standing upon said platform area with feet in side by side or front and rear positions, at least one rear wheel rotatably journaled by said platform and contacting the ground within an area that underlies a vertical projection of said rider's area on the ground, power means under said platform for driving said rear wheel and at least one dirigible front wheel position beneath said platform and forwardly of said rear wheel.

2. A self-propelled wheeled vehicle according to claim 1 wherein the powering means includes an internal combustion engine.

3. A self-propelled wheeled vehicle according to claim 1 further including a steering shaft extending upwardly from the platform and carrying a handlebar at its upper end for steering of the front wheel.

4. A self-propelled wheeled vehicle according to claim 3 wherein the steering shaft is connected to a fork supporting the front wheel by a pivot joint for permitting folding of the handle from an upright position to a lowered storage position.

5. A self-propelled wheeled vehicle according to claim 1 wherein there is only a single front wheel and a single rear wheel.

6. A self-propelled wheeled vehicle according to claim 5 wherein the front and rear wheels have sufficient width so that the vehicle is stable in an upright position regardless of whether a rider is standing upon the platform.

7. A self-propelled two-wheeled vehicle according to claim 6 further including a steering shaft extending upwardly from the platform and carrying a handlebar at its upper end for steering of the front wheel.

8. A self-propelled two-wheeled vehicle according to claim 7 wherein the steering shaft is connected to a fork supporting the front wheel by a pivot joint for permitting folding of the handle from an upright operating position to a lower storage position.

* * * * *

UNITED STATES PATENT AND TRADEMARK OFFICE
CERTIFICATE OF CORRECTION

PATENT NO. : 4,842,091

DATED : June 27, 1989

INVENTOR(S) : William J. Badsey

It is certified that error appears in the above-identified patent and that said Letters Patent is hereby corrected as shown below:

Column 1, line 45, "stil a" should be --a still--.

Column 2, line 19, "EMBODIMENTS" should be --EMBODIMENT--.

Column 2, line 37, "that" should be --the--.

Column 2, line 52, "16" should be --15--.

Column 3, line 5, after "that" insert --it--.

Column 3, line 5, "an" should be --in--.

Column 3, line 46, "tupe" should be --type--.

Column 4, line 45, Claim 1, "position" should be --positioned--.

Column 6, line 3, Claim 8, "lower" should be --lowered--.

Signed and Sealed this

Twenty-first Day of January, 1992

*Attest:*

HARRY F. MANBECK, JR.

*Attesting Officer*  *Commissioner of Patents and Trademarks*